(12) United States Patent
Fujihara et al.

(45) Date of Patent: Oct. 6, 2020
(10) Patent No.: US 10,795,790 B2

(54) STORAGE CONTROL APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Takashi Fujihara, Kawasaki (JP); Tomonori Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 16/004,485

(22) Filed: Jun. 11, 2018

(65) Prior Publication Data
US 2018/0365118 A1 Dec. 20, 2018

(30) Foreign Application Priority Data
Jun. 16, 2017 (JP) ................ 2017-118972

(51) Int. Cl.
G06F 11/00 (2006.01)
G06F 11/20 (2006.01)
G06F 12/02 (2006.01)
G06F 3/06 (2006.01)
G11B 5/00 (2006.01)
(Continued)

(52) U.S. Cl.
CPC ........ G06F 11/2094 (2013.01); G06F 3/0619 (2013.01); G06F 3/0644 (2013.01); G06F 3/0676 (2013.01); G06F 11/1092 (2013.01); G06F 12/0223 (2013.01); G11B 5/00 (2013.01); *G06F 11/076* (2013.01); *G06F 11/0727* (2013.01); *G06F 11/0793* (2013.01);
(Continued)

(58) Field of Classification Search
CPC ............ G06F 11/2094; G06F 11/0793; G06F 11/0727; G06F 11/0766; G06F 11/1092
See application file for complete search history.

(56) References Cited

U.S. PATENT DOCUMENTS 5,808,825 A 9/1998 Okamura
2006/0271809 A1* 11/2006 Ichikawa ............ G06F 11/0727
714/2
(Continued)

FOREIGN PATENT DOCUMENTS

JP 09-251728 9/1997
JP 2006-338734 12/2006
WO 2008/114359 9/2008

*Primary Examiner* — Charles Ehne
(74) *Attorney, Agent, or Firm* — Fujitsu Patent Center

(57) ABSTRACT

A storage control apparatus is configured to access a physical storage region of a storage apparatus corresponding to a logical address of a logical storage region, when an error is detected, specify a physical address of the physical storage region, for each of a plurality of regions generated by dividing the physical storage region using a plurality of division conditions different from each other, specify a number of times in which the error is detected, specify a recovery target region in which the number of times is equal to or greater than a first value, specify a first division condition generating the recovery target region, select, from a plurality of recovery methods, a first recovery method corresponding to the first division condition, and cause the storage apparatus to recover a first logical address in the logical storage region corresponding to the recovery target region by using the first recovery method.

20 Claims, 15 Drawing Sheets

(51) Int. Cl.
*G06F 11/10* (2006.01)
*G06F 11/07* (2006.01)

(52) U.S. Cl.
CPC .... *G06F 2201/805* (2013.01); *G06F 2201/82* (2013.01); *G06F 2212/1032* (2013.01)

(56) References Cited

U.S. PATENT DOCUMENTS

2007/0220313 A1* 9/2007 Katsuragi ........... G06F 11/0727
714/6.22
2017/0315879 A1* 11/2017 Park ................... G06F 11/1469

* cited by examiner

FIG. 6

| SECTOR MANAGEMENT TABLE | | | 213 |
|---|---|---|---|
| SECTOR RANGE | ERROR NUMBER | ERROR NUMBER THRESHOLD VALUE | |
| HEAD 0, SECTOR 0 | 1 | 3 | |
| HEAD 0, SECTOR 1 | 2 | 3 | |
| ... | ... | ... | |

FIG. 7

| TRACK MANAGEMENT TABLE | | | | 214 |
|---|---|---|---|---|
| HEAD NUMBER | TRACK NUMBER | ERROR NUMBER | ERROR NUMBER THRESHOLD VALUE | |
| 0 | 0 | 5 | 10 | |
| 0 | 1 | 2 | 10 | |
| ... | ... | ... | ... | |

FIG. 10

| HEAD MANAGEMENT TABLE | | | 215 |
|---|---|---|---|
| HEAD NUMBER | ERROR NUMBER | ERROR NUMBER THRESHOLD VALUE | |
| HD1 | 2 | 5 | |
| HD2 | 3 | 5 | |
| ... | ... | ... | |

STORAGE CONTROL APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-118972, filed on Jun. 16, 2017, the entire contents of which are incorporated herein by reference.

FIELD

The embodiments discussed herein relate to a storage control apparatus, a method and a non-transitory computer-readable storage medium.

BACKGROUND

In the case where an error occurs upon accessing to a storage apparatus, some recovery process is sometimes executed by a storage apparatus such that an error may not occur. For example, a hard disk drive (HDD) in recent years accepts an access thereto in response to designation not of a physical address but of a logical address in a physical storage region in the HDD. In the case where an error occurs when a control apparatus accesses such an HDD as just described, the control apparatus may issue a request to the HDD to change the allocation of the physical address to the logical address of the address destination. Consequently, an error does not occur upon later accessing to the same logical address, and the controlling apparatus may use the HDD continuously. It is to be noted that, in the small computer system interface (SCSI) standard, a Reassign Blocks command for requesting allocation change of a physical address in such a manner as described above is prescribed.

Further, such a technology as described below has been proposed in regard to a process executed in response to occurrence of an error. For example, a data storage apparatus has been proposed in which an execution order of an error recovery step is determined using a same error recovery log against an access error to a sector specified by a same head number and cylinder number. Further, a disk malfunction prediction apparatus has been proposed which issues a notification of malfunction prediction of a disk apparatus when periodicity of an error, based on error position information indicative of a position at which a read error of data occurs, is detected. Further, a disk recording and reproduction apparatus has been proposed which estimates, when a read error occurs, that a cause of a read error is a thermal asperity phenomenon of a magnetoresistive (MR) head based on a result of a read retry process. Examples of the related art include Japanese Laid-open Patent Publication No. 2006-338734, International Publication Pamphlet No. 2008/114359, and Japanese Laid-open Patent Publication No. 9-251728.

SUMMARY

According to an aspect of the embodiments, a storage control apparatus includes a memory, and a processor coupled to the memory and configured to access a physical storage region of a storage apparatus corresponding to a logical address of a logical storage region, when an error is detected in accessing to the physical storage region of the storage apparatus, specify a physical address of the physical storage region, for each of a plurality of regions generated by dividing the physical storage region using a plurality of division conditions different from each other, specify a number of times in which the error is detected, specify, from the plurality of regions, a recovery target region in which the number of times is equal to or greater than a first value, specify, from the plurality of division conditions, a first division condition generating the recovery target region, select, from a plurality of recovery methods, a first recovery method corresponding to the first division condition, and cause the storage apparatus to recover a first logical address in the logical storage region corresponding to the recovery target region by using the first recovery method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view depicting an example of a sector management table;

FIG. 7 is a view depicting an example of a track management table;

FIG. 10 is a view depicting an example of a head management table;

DESCRIPTION OF EMBODIMENTS

In a storage apparatus, a failure sometimes occurs over a comparatively wide range on a recording medium. For example, a scar sometimes occurs on a recording medium. Occurrence of a failure is detected from an error that occurs, for example, when a control apparatus accesses a storage apparatus in accordance with a request from a host apparatus. However, according to the detection method, since the entire failure occurrence region over a wide range may not necessarily be accessed, it is difficult to detect the entire region.

For example, there is a method by which patrol for checking whether normal reading out may be performed while the entire storage apparatus is scanned little by little is executed. By this method, the possibility increases that the entire failure occurrence region over a wide range may be detected. However, in a storage apparatus having a large capacity, much time may be required to check the entire storage apparatus by patrol. Therefore, there is the possibility that much time may be required for detection of the entire failure occurrence region over a wide range. As a result, there is a problem that it is difficult to rapidly execute a recovery process for a failure occurrence region over a wide range.

First Embodiment

Figure 1:
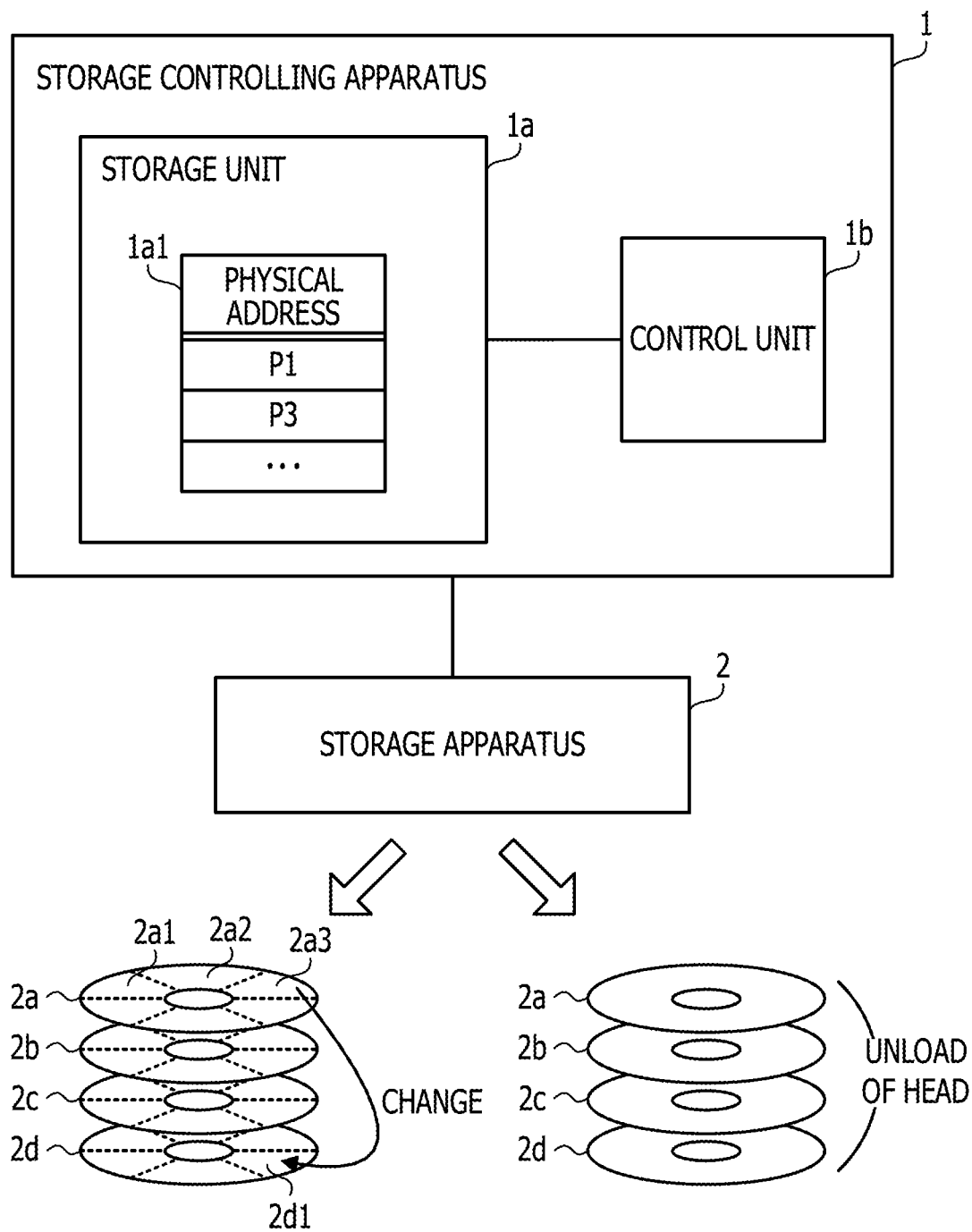
FIG. 1 is a view depicting an example of a storage controlling apparatus of a first embodiment.

FIG. 1 is a view depicting an example of a storage controlling apparatus of a first embodiment. The storage controlling apparatus 1 is coupled to a storage apparatus 2. The storage apparatus 2 is, for example, an HDD.

The storage controlling apparatus 1 includes a storage unit 1a and a control unit 1b. The storage unit 1a may be a volatile storage apparatus such as a random access memory (RAM) or a nonvolatile storage apparatus such as an HDD or a flash memory. The control unit 1b is, for example, a processor. The processor may include a central processing unit (CPU), a digital signal processor (DSP), an application specific integrated circuit (ASIC), a field programmable gate array (FPGA) or the like. Further, the control unit 1b may be a multiprocessor.

The storage unit 1a stores error management information 1a1. A physical address of a region in which an error occurs upon accessing from the storage controlling apparatus 1 from within a physical storage region of the storage apparatus 2 is registered into the error management information 1a1.

The control unit 1b designates a logical address in a logical storage region corresponding to the storage apparatus 2 to access the storage apparatus 2. Further, in the case where an error is detected upon accessing to the storage apparatus 2, the control unit 1b registers a physical address into the physical storage region of the storage apparatus 2 allocated to a logical address of an access destination into the error management information 1a1.

The control unit 1b divides the physical storage region of the storage apparatus 2 using a plurality of division conditions to generate a plurality of divisional regions to perform management. Further, the control unit 1b tabulates the number of times of error detection based on the error management information 1a1 for each of the plurality of divisional regions. For example, it is assumed that the storage apparatus 2 is an HDD that includes magnetic disks 2a to 2d. It is to be noted that, for the simplification of the description, it is assumed that data is recorded only on one face of each of the magnetic disks 2a to 2d. In such a storage apparatus 2 as described above, divisional regions may be generated, for example, in the following manner.

For example, divisional regions are generated using a first division condition that each of the magnetic disks 2a to 2d is divided. In the example of FIG. 1, each of the magnetic disks 2a to 2d is equally divided into six regions. Consequently, for example, divisional regions 2a1, 2a2, 2a3, . . . are generated on the magnetic disk 2a. As a division method, there is a method in which each of the magnetic disks 2a to 2d is divided along lines extending radially from the center. Also there is a method in which each of tracks of the magnetic disks 2a to 2d is used as a divisional region.

Further, divisional regions are generated using a second division condition that a magnetic disk is divided in a unit. In this case, each of the magnetic disks 2a to 2d is a divisional region.

It is to be noted that the division conditions of the present embodiment are provided in order to allow the control unit 1b of the storage controlling apparatus 1 to manage the physical storage region of the storage apparatus 2 according to original criteria independently of the allocation management between the physical storage region and the logical storage region in the inside of the storage apparatus 2.

After the number of times of error detection is tabulated for each divisional region generated in this manner, the control unit 1b specifies a divisional region in which the number of times of error detection is great (hereinafter referred to as "recovery target region") based on a given reference from among the divisional regions. In the case where a recovery target region is specified, the control unit 1b selects a recovery method corresponding to the division conditions used upon division of the recovery target region from among a plurality of recovery methods determined in advance. Then, the control unit 1b controls the storage apparatus 2 to execute a recovery process for a logical address in the logical storage region corresponding to the recovery target region using the selected recovery method.

For example, in the case where the divisional region 2a3 is detected as a recovery target region, the control unit 1b selects a recovery method corresponding to the first condition described above. As an example of the recovery method selected in this case, there is a method that a physical address allocated to a logical address is changed. In the case where this method is used, for example, the control unit 1b specifies a logical address in the logical storage region corresponding to the divisional region 2a3 that is a recovery target region and issues a request to the storage apparatus 2 to change the allocation of the physical address in regard to the specified each logical address. The storage apparatus 2 changes the physical address allocated to the specified each logical address (for example, physical address in the divisional region 2a3) into a physical address of a different unused divisional region 2d1.

In the case where a great number of errors occur in a region obtained by dividing a magnetic disk like the divisional region 2a3, there is the possibility that a local failure such as a scar may have been occurred in the region. Therefore, by changing the allocation of the physical address such that the divisional region 2d1 is used in place of the divisional region 2a3, the control unit 1b may normally access the logical address associated with the physical address of the divisional region 2a3.

Further, for example, in the case where the magnetic disk 2a is detected as the recovery target region, the control unit 1b selects a recovery method corresponding to the second condition described above. As an example of the recovery method selected in this case, there is a method by which a magnetic head is unloaded to remove dirt adhering to the magnetic head. In the case where this method is used, the control unit 1b issues a request to the storage apparatus 2 to unload the magnetic head. The storage apparatus 2 causes the magnetic head to be retracted from the magnetic disk 2a and contacted with the lamp. Consequently, the dirt adhering to the magnetic head is removed. Thereafter, the control unit 1b issues a request to the storage apparatus 2 to load the magnetic head again, and the storage apparatus 2 loads the magnetic head.

In the case where a great number of errors occur on the magnetic disk 2a, there is a high degree of possibility that the error factor may be a failure relating to the entire magnetic disk 2a rather than a local failure on the magnetic disk 2a. As an example, there is the possibility that dirt adheres to the magnetic head. Therefore, by performing unloading of the magnetic head and removing the dirt on the magnetic head, it becomes possible for the control unit 1b to normally access a logical address associated with the physical address of the magnetic disk 2a.

According to the process described above, in the case where a certain divisional region is specified as a recovery target region in which the number of times of error detection is great, the control unit 1b estimates that a failure extending over a wide range within the recovery target region occurs and controls the storage apparatus 2 to execute the recovery process for the recovery target region. Consequently, the existing position of the entire failure occurrence region is detected and the recovery process is executed before the entire failure occurrence region is detected depending upon occurrence of an error upon accessing from the control unit 1b. Therefore, it becomes possible to detect a failure occurrence region over a wide range at an early stage, and, as a result, the recovery process relating to the failure occurrence region may be started at an early stage.

By executing the recovery process relating to the failure occurrence region at an early stage as described above, the number of times at which an error occurs upon later accessing to the storage apparatus 2 by the control unit 1b decreases. As a result, the accessing performance from the storage controlling apparatus 1 to the storage apparatus 2 is improved. Further, by executing the recovery process at an early stage, also it is possible to achieve elongation of the life of the storage apparatus 2.

Further, in the process described above, a recovery method corresponding to a division condition used upon division of a recovery target region is selected from among a plurality of recovery methods. Consequently, the control unit 1b may control the storage apparatus 2 to execute a recovery process using an appropriate recovery method according to the nature of the recovery target region.

Second Embodiment

Figure 2:
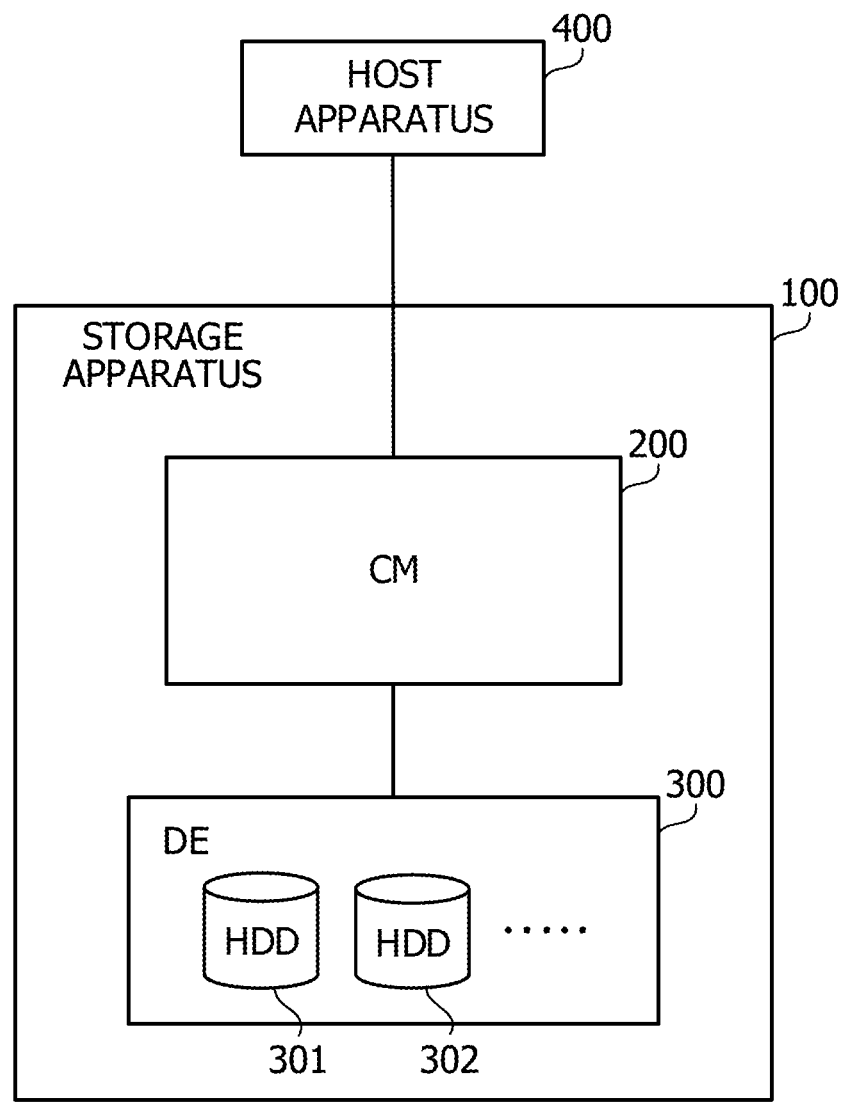
FIG. 2 is a view depicting an example of a storage system of a second embodiment.

FIG. 2 is a view depicting an example of a storage system of a second embodiment. The storage system depicted in FIG. 2 includes a storage apparatus 100 and a host apparatus 400. The storage apparatus 100 and the host apparatus 400 are coupled to each other through a storage area network (SAN) for which, for example, a fibre channel (FC), an internet small computer system interface (iSCSI) or the like is used.

The storage apparatus 100 includes a CM 200 and a device enclosure (DE) 300. The CM 200 performs reading and writing of data from and on HDDs 301, 302, . . . incorporated in the DE 300. The CM 200 manages storage regions implemented by a plurality of HDDs in the DE 300 by a redundant arrays of inexpensive disks (RAID) system and controls access to the storage regions. The DE 300 is a disk array apparatus in which the HDDs 301, 302, . . . that become a target of access control in accordance with a request from the host apparatus 400 are incorporated.

Figure 3:
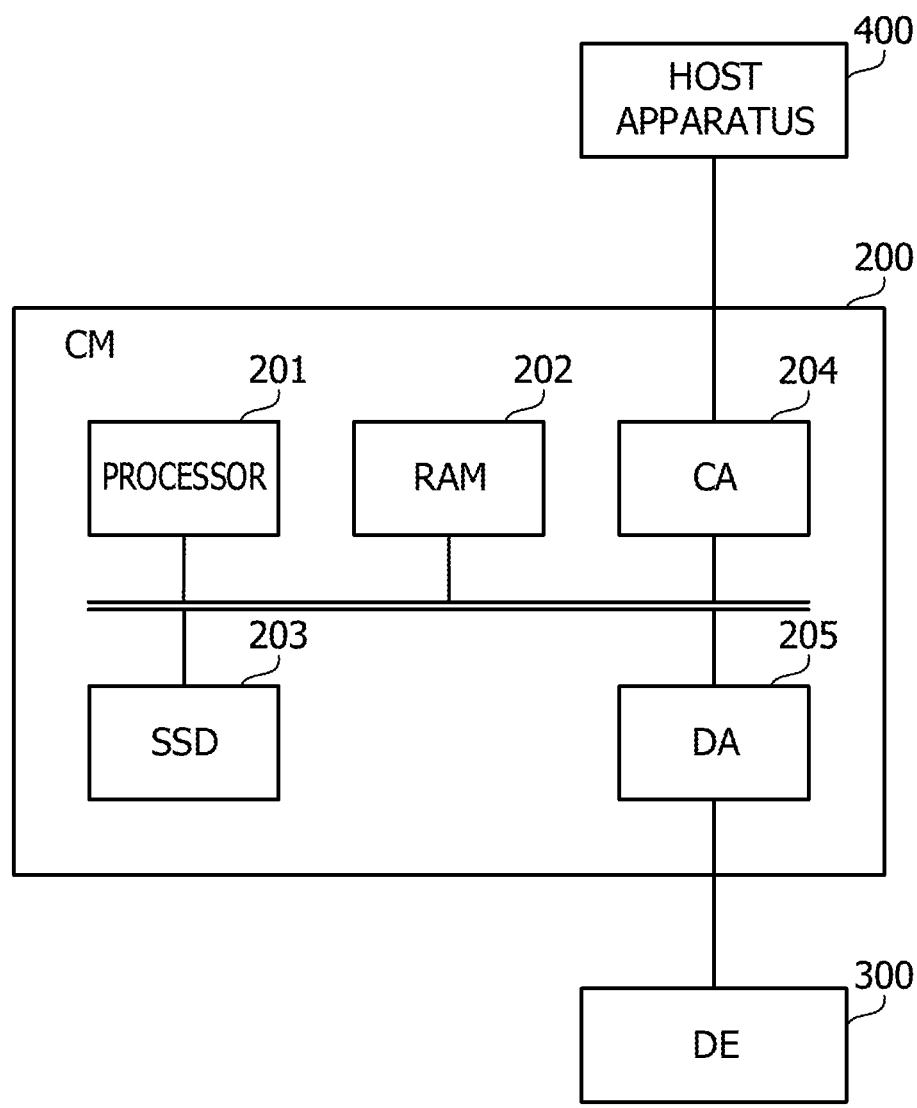
FIG. 3 is a view depicting an example of hardware of a controller module (CM)

FIG. 3 is a view depicting an example of hardware of a CM. The CM 200 includes a processor 201, a RAM 202, a solid state drive (SSD) 203, a channel adapter (CA) 204, and a disk adapter (DA) 205.

The processor 201 controls information processing of the CM 200. The processor 201 may be a multiprocessor including a plurality of processing elements.

The RAM 202 is a main storage apparatus of the CM 200. The RAM 202 temporarily stores at least part of a program of an operating system (OS) and application programs to be executed by the processor 201. Further, the RAM 202 stores various data to be used for processing by the processor 201.

The SSD 203 is an auxiliary storage apparatus of the CM 200. The SSD 203 is a nonvolatile semiconductor memory. In the SSD 203, a program of an OS, application programs, and various data are stored. It is to be noted that the CM 200 may include an HDD as an auxiliary storage apparatus in place of the SSD 203.

The CA 204 is an interface for communicating with the host apparatus 400. The DA 205 is an interface for communicating with the DE 300.

Figure 4:
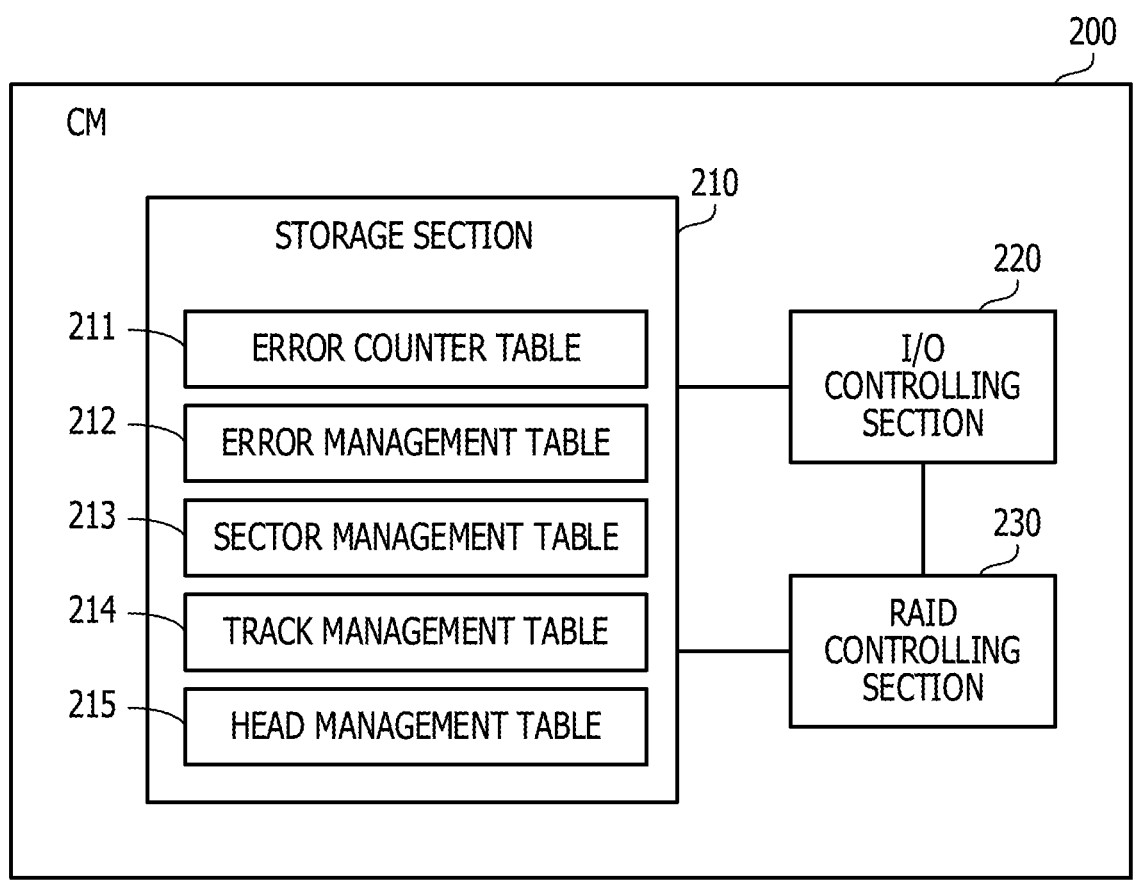
FIG. 4 is a view depicting an example of functions of a CM.

FIG. 4 is a view depicting an example of functions of a CM. The CM 200 includes a storage section 210, an input/output (I/O) controlling section 220, and a RAID controlling section 230.

The storage section 210 is incorporated as a storage region secured in the RAM 202 or the SSD 203. The storage section 210 stores an error counter table 211, an error management table 212, a sector management table 213, a track management table 214, and a head management table 215.

The error counter table 211 retains the number of errors detected in each of the HDDs 301, 302, . . . in the DE 300. On the other hand, the error management table 212, the sector management table 213, the track management table 214, and the head management table 215 are created individually for the HDDs 301, 302, . . . in the DE 300 and stored into the storage section 210.

The error management table 212 retains information of a place at which an error occurs. The sector management table 213 retains the number of errors occurring in a unit of a sector region on an HDD. The sector region is a divisional region obtained by dividing a recording face of a magnetic disk radially at equal distances. The track management table 214 manages the number of errors occurring in a unit of a track. The head management table 215 manages the number of errors occurring in a unit of a recording face of a magnetic disk indicated by a head number.

The I/O controlling section 220 and the RAID controlling section 230 are incorporated, for example, as modules of programs executed by the processor 201.

To the CM 200, logical volumes that become an access target from the host apparatus 400 are set. The I/O controlling section 220 accepts an access request to a logical volume from the host apparatus 400. Further, to the CM 200, a RAID group implemented by a plurality of HDDs in the DE 300 is set. The RAID group is a logical storage region that is implemented by a plurality of HDDs and whose reading and writing are controlled in accordance with a given RAID level. The RAID controlling section 230 controls access to the RAID group.

To one RAID group, one or more logical volumes may be allocated. In the following description, in order to simplify the description, it is assumed that one logical volume is allocated to one RAID group. In this case, the I/O controlling section 220 receives a logical address indicative of an access destination on a logical volume from the host apparatus 400 and designates the received logical address as it is to the RAID controlling section 230 to cause the RAID controlling section 230 to execute I/O processing of data corresponding to the logical address. In the case where reading out of data is requested, the I/O controlling section 220 receives the read out data from the RAID controlling section 230 and transmits the data to the host apparatus 400.

On the other hand, in the case where writing of data is requested, when the I/O controlling section 220 receives a write completion notification from the RAID controlling section 230, it uses a response indicative of the write completion to the host apparatus 400.

It is to be noted that, in the case where a plurality of logical volumes are allocated to one RAID group, the I/O controlling section 220 converts a logical address received from the host apparatus 400 into a logical address in the logical storage region (RAID logical unit (RLU)) corresponding to the RAID group. The I/O controlling section 220 outputs the logical address after the conversion to the RAID controlling section 230.

The RAID controlling section 230 specifies one or more HDDs to be made an access target from among the HDDs 301, 302, . . . in the DE 300 based on a logical address designated from the I/O controlling section 220 and accesses the specified HDD. For example, if a request for writing of data is received from the I/O controlling section 220, the RAID controlling section 230 performs write control such that the data may be made redundant in the plurality of HDDs.

As a particular example, it is assumed that a RAID group that is controlled in accordance with RAID-5 by six HDDs is set. In this case, the RAID controlling section 230 divides the data whose writing is requested from the I/O controlling section 220 and writes the five successive divisional data and parities based on the divisional data in a distributed manner into regions of a same stripe number of the six HDDs.

Further, the RAID controlling section 230 has a statistical point addition function of registering an occurrence time number of errors occurring upon access to an HDD into the error counter table 211 and deciding a malfunction of the HDD based on the registered error occurrence time number. In the present embodiment, a count value indicative of an error occurrence time number of errors occurring upon reading out request to the HDD is registered for each HDD in the error counter table 211.

For example, in the case where the RAID controlling section 230 detects an error when it issues a request for reading out to a certain HDD in response to a request from the I/O controlling section 220, the RAID controlling section 230 increments the count value registered in the error counter table 211 and corresponding to the HDD of the destination of the reading out request. Further, the RAID controlling section 230 periodically executes a patrol process for trying to decide whether data may be read out regularly from an HDD. In the patrol process, data is read out from a given number of blocks on the HDD to which sequential addresses are applied at fixed time intervals. In the case where an error occurs upon reading out of data, the RAID controlling section 230 increments the count number corresponding to the HDD of the reading out request destination registered in the error counter table 211. Then, in the case where the count value of errors for a certain HDD exceeds a given threshold value, the RAID controlling section 230 decides that the HDD fails and decouples the HDD.

Incidentally, each of the HDDs 301, 302, . . . incorporated in the DE 300 includes a plurality of magnetic disks as recording media. Here, the storage capacity recognized by the CM 200 as being had by each of the HDDs 301, 302, . . . is smaller than the physical storage capacity of each magnetic disk each of the HDDs 301, 302, . . . actually includes.

For example, it is assumed that, although a certain HDD in the DE 300 causes the storage capacity of 100 GB to be recognized by the CM 200, it actually has a physical storage capacity of 150 GB. In this case, the CM 200 recognizes the HDD as a logical storage region of 100 GB and accesses the HDD by designating a logical block address (LBA) in the logical storage region. On the other hand, a controller built in the HDD manages the LBAs and physical addresses in the physical storage region by the magnetic disks in an associated relationship with each other. With an LBA, only a region of 100 GB from within the physical storage region of 150 GB is associated.

In an initial state, the remaining 50 GB from within the physical storage region of 150 GB are prepared as an unused replacement region. In accordance with a request from the CM 200, the controller of the HDD may replace a physical address associated with a certain LBA with a physical address in the replacement region. In the following, a process of replacing a physical address corresponding to an LBA of an HDD in this manner is sometimes referred to as "replacement process."

For example, in the case where an error occurs when a request for reading out from a certain LBA of an HDD is issued, the RAID controlling section 230 of the CM 200 instructs the HDD to execute a replacement process for the LBA. It is to be noted that such error occurrence includes that when a request for reading out is issued to the HDD in response to the request from the I/O controlling section 220 and that when a request for reading out is issued to the HDD in a patrol process.

The controller of the HDD that receives the execution instruction replaces a physical address corresponding to the LBA with a physical address in the replacement region. Then, the RAID controlling section 230 restores data whose reading out has failed using data stored in a different HDD belonging to a RAID group same as that of the HDD. Then, the RAID controlling section 230 issues a request to write the restored data designating the LBA with which the reading out error has occurred to the HDD. Consequently, the controller of the HDD writes the data whose writing is requested into the physical storage region indicated by the physical address after the replacement.

Since the LBA with which the reading out error has occurred is recovered by such a process as described above, the RAID controlling section 230 may thereafter execute data reading out from the recovered LBA normally. For example, by combining such a replacement process and data restoration as described above, even in the case where a reading out error from an HDD occurs, it is possible to continue to use the HDD as it is without exchanging the same for a period of time until all replacement regions are used up in the longest.

Here, in the process described above, as a result of issuance of a request for reading out from a failure occurrence region of an HDD and detection of a reading out error, the failure occurrence region is detected. Then, as a result of execution of a replacement process for an LBA with which the reading out error is detected, it becomes possible to thereafter execute reading out from the same LBA normally without detecting an error.

However, such a detection method for a failure occurrence region as described above has a problem in that, in the case where a failure extending to some extent, for example, like a scar on a magnetic disk occurs on an HDD, it is difficult to detect the entire failure occurrence region at an early stage. For example, if a patrol process is executed periodically, the possibility that a failure occurrence region extending over a greater range may be detected increases. However, in an HDD of a large capacity, a very long period of time may be required to scan the overall storage region of the HDD by a patrol process. For example, even if data is read out 2 MB by 2 MB at intervals of one second by a patrol process, approximate two months may be required to scan the overall storage region of an HDD of 10 TB.

If a failure occurrence region over a wide range is not successfully detected at an early stage, although a recovery function is provided, a large number of LBAs with which a reading out error may occur in the future remain, therefore the occurrence time number of a reading out error increases as a whole. As a result, the reading out performance of the HDD degrades. For example, the response performance when the I/O controlling section 220 issues a request for reading out from the HDD to the RAID controlling section 230 in response to a request from the host apparatus 400 decreases. As a result, there is a problem that the response performance to an access request from the host apparatus 400 degrades.

Further, according to such specifications that, if the statistical point addition function described hereinabove is used such that, when a reading out error occurs, the corresponding count value of the error counter table 211 counts up, there is a problem described below.

In the case where the statistical point addition function is used, as the occurrence time number of reading out errors from a certain HDD increases, the time until the HDD is decided to be faulty decreases. Therefore, if a failure occurs in a wide range of a magnetic disk and the number of occurrence times of reading out errors becomes great, the possibility that the HDD may be decided to be faulty based on the count value of the error counter table 211 becomes high long before all replacement regions are used up.

Therefore, the RAID controlling section 230 in the present embodiment estimates a failure occurrence region in the physical storage region of an HDD before it issues a request for data reading out from the entire failure occurrence region and controls the HDD to execute a replacement process of the estimated failure occurrence region. Consequently, it is possible to detect and recover a failure occurrence region over a wide range at an early stage. As a result, since the number of times by which an error is detected upon request for data reading out decreases, degradation of the reading out performance of the HDD by occurrence of a failure may be suppressed. Further, since the error detection time number decreases, the time until the HDD is decided to be faulty based on the count value of the error counter table 211 may be elongated while the number of replacement regions as great as possible are used.

For example, the RAID controlling section 230 registers a physical address associated with an LBA, with which an error occurs upon reading out request from the HDD, into the error management table 212. The RAID controlling section 230 aggregates, using the sector management table 213, the track management table 214, and the head management table 215, the error occurrence time number for each of divisional regions obtained by division of physical storage regions of the HDD in accordance with different division conditions. Then, the RAID controlling section 230 estimates that a failure, in a wide range a divisional region in which the error occurrence time number exceeds a given threshold value, occurs and controls the HDD to execute a replacement process for the divisional region.

Figure 5:
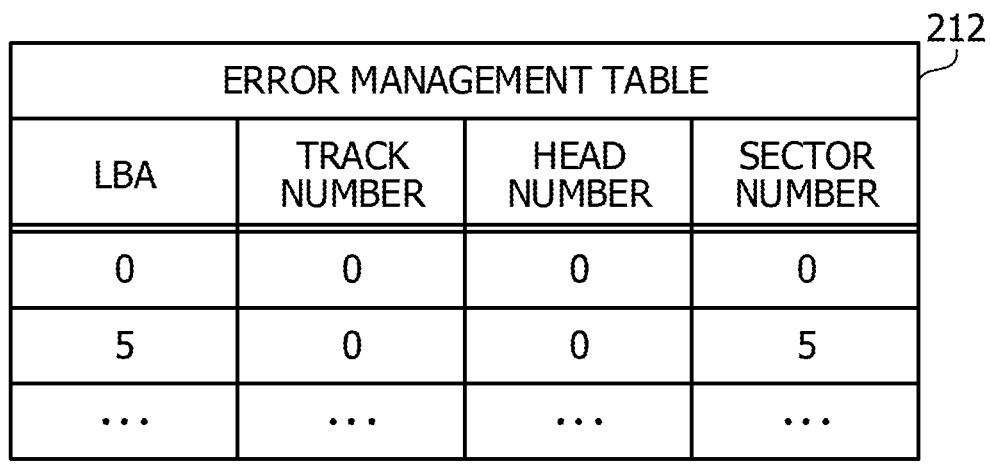
FIG. 5 is a view depicting an example of an error management table.

FIG. 5 is a view depicting an example of an error management table. The error management table 212 is created for each HDD disk incorporated in the DE 300 and stored in the storage section 210. The error management table 212 includes items of an LBA, a track number, a head number, and a sector number.

If an error is detected upon reading out request for an LBA of a corresponding HDD, a record corresponding to the LBA is added to the error management table 212. The item of an LBA indicates an LBA in which a reading out error is detected. The items of a track number, a head number, and a sector number indicate a physical address of a physical storage region associated with the LBA upon error detection. The item of a track number indicates an identification number of a track (cylinder). The item of a head number indicates an identification number of a head. If it is assumed that a plurality of magnetic disks (platters) are incorporated in the HDD and data are recorded on the opposite faces of each magnetic disk, the identification number of a head identifies a recording face of a magnetic disk (hereinafter referred to as "magnetic disk face"). The item of a sector number indicates an identification number of a sector on a track indicated by a track number.

FIG. 6 is a view depicting an example of a sector management table. The sector management table 213 is created by the RAID controlling section 230 based on the error management table 212 corresponding to the same HDD and is stored into the storage section 210. The sector management table 213 includes items of a sector range, an error number, and an error number threshold value.

In the sector management table 213, a record is registered in advance for each sector range of the HDD. The sector range is a divisional region obtained by equally dividing a certain magnetic disk face radially. The item of a sector range indicates a physical address indicative of a sector range. In the case where the tracks have a same sector number, the sector range is represented by a combination of a head number and a given sector number. On the other hand, in the case where the tracks have different sector numbers, the sector range is represented, for one head number, by a track number of each track, and one or more sector numbers set for the track.

The item of an error number indicates a total number of errors detected within a sector range. For example, in the item of an error number, a total number of records whose physical addresses belonging to a sector range are registered from among records registered in the error management table 212 are registered. The error number threshold value is a threshold value for deciding whether or not a replacement process is to be executed. Basically, if the capacities of the sector ranges are equal to each other, also the error threshold values for the sector ranges may be equal to each other. However, the error number threshold value may be made different among different sector ranges.

By using the sector management table 213 having such a configuration as described above, an error occurrence time number is aggregated for each divisional region called "sector range" obtained by dividing a physical storage region of an HDD.

FIG. 7 is a view depicting an example of a track management table. The track management table 214 is created by the RAID controlling section 230 based on the error management table 212 corresponding to the same HDD and is stored into the storage section 210. The track management table 214 includes items of a head number, a track number, an error number, and an error number threshold value.

In the track management table 214, a record for each of the tracks on the HDD is stored in advance. In the item of a head number, a head number indicative of a magnetic disk face on which a track is positioned is registered. In the item of a track number, an identification number of a track (cylinder) is indicated. One track on one magnetic disk face is identified by the head number and the track number.

The item of an error number indicates a total number of errors detected in a track. For example, in the item of an error number, a total number of records in which physical addresses belonging to the track are registered from among records registered in the error management table 212 is registered. The error number threshold value is a threshold value for deciding whether or not a replacement process is to be executed. For example, in the case where the sector number differs among different tracks, the value of the error number threshold value is set higher for a track having a greater number of sectors. At this time, basically it is preferable that the ratio between the sector number and the error number on a track is fixed for each track.

By using the track management table 214 having such a configuration as described above, an error generation time number is aggregated for each divisional region called "track" obtained by dividing the physical storage region of the HDD.

Here, a case in which, as a failure of a magnetic disk face of the HDD, a scar exists on a magnetic disk face is described.

Figure 8A:
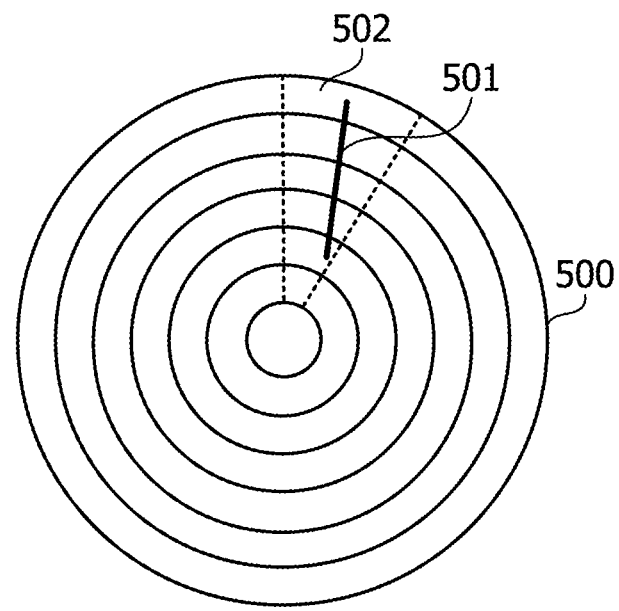
FIGS. 8A and 8B are image diagrams in a case where a scar exists on a magnetic disk face.
Figure 8B:
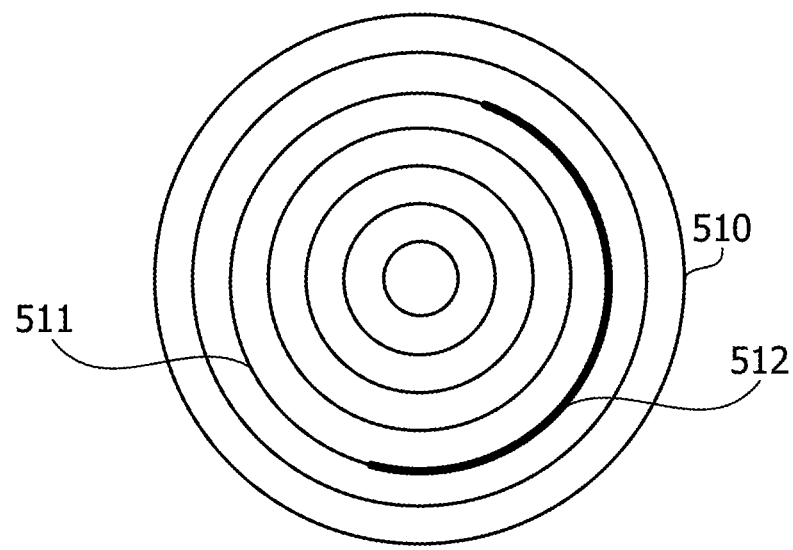

FIGS. 8A and 8B are image diagrams where a scar exists on a magnetic disk face. FIG. 8A depicts a state in which a scar 501 exists on a magnetic disk face 500. The scar 501 extends in such a manner as to cross tracks on the magnetic disk face 500. A scar extending so as to cross with tracks in this manner is sometimes referred to as "longitudinal scar."

Since physical storage regions (sectors) are successively allocated in a direction along a track to LBAs of an HDD, reading out access to the magnetic disk face 500 occurs many times in a direction along a track. Therefore, time may be required until the entire scar 501 extending so as to cross with tracks as depicted in FIG. 8A is detected by a reading out access.

In contrast, in the case where the scar 501 is included in a sector range 502 surrounded by radial dotted lines, in a record in the sector management table 213 corresponding to the sector range 502, the possibility that the error number may exceed the error number threshold value is high. Accordingly, the RAID controlling section 230 may estimate based on the sector management table 213 that the scar 501 exists in the sector range 502 before it performs a reading access to the entire sector range 502. Then, the RAID controlling section 230 may continue access to the LBAs allocated to the sector range 502 by executing a replacement process for the entire sector range 502.

On the other hand, FIG. 8B depicts a state in which a scar 512 exists along a track 511 of a magnetic disk face 510. In the patrol process described above, reading out is performed from a range of successive LBAs of a fixed size such as several MB at fixed intervals of time. Therefore, such a scar 512 that extends along the track 511 is likely to be found out by the patrol process. However, since most part of the scar 512 is read out in a short period of time by the patrol process and the count value of the error counter table 211 increases suddenly, the HDD is likely to be decided as faulty.

In contrast, in a record in the track management table 214 corresponding to the track 511, the possibility that the error number may exceed the error number threshold value before most part of the scar 512 is read out is high. Accordingly, the RAID controlling section 230 may estimate based on the track management table 214 that the scar 512 exists on the track 511 before it performs a reading out access to most part of the scar 512. Then, by executing a replacement process for the entire track 511, the RAID controlling section 230 may continue to access the LBAs allocated to the track 511.

Incidentally, failures occurring in an HDD include some failure that may be restored without performing a replacement process. When occurrence of such a failure as just described is presumed, if a replacement process is performed for the HDD, a replacement region on the HDD is wasted, and as a result, the period within which the HDD may be used continuously decreases. Therefore, if the RAID controlling section 230 presumes that such a recoverable failure as described above occurs, it controls the HDD to execute not a replacement process but such a different recovery process as to recover the HDD against the failure.

As an example of such a recoverable failure, there is a case in which dirt such as dust, oil or the like adheres to a head. In this case, there is the possibility that it may be possible to recover the HDD against a failure by issuing a request to the HDD to unload the head from the RAID controlling section 230.

Figure 9A:
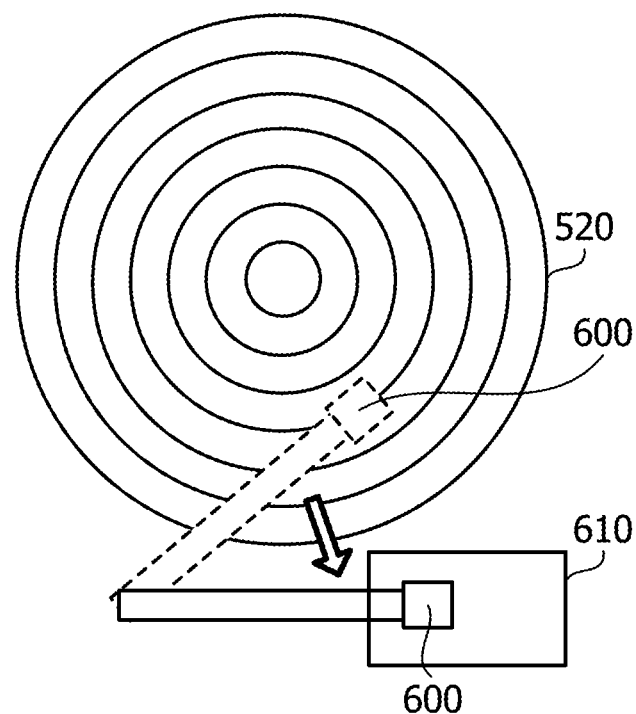
FIGS. 9A and 9B are views depicting a relationship between a head and a lamp an HDD includes.
Figure 9B:
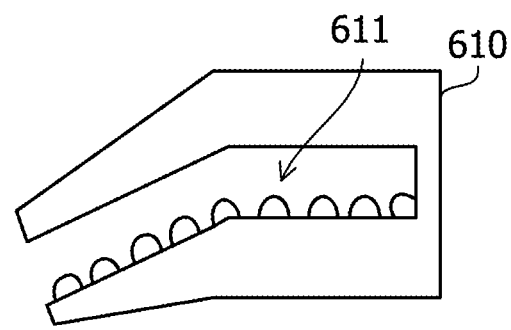

FIGS. 9A and 9B are views depicting a relationship between a head and a lamp an HDD includes. FIG. 9A depicts loading and unloading of a head 600. In the inside of a housing of the HDD, a lamp 610 is disposed outside a magnetic disk face 520. If the head 600 is unloaded from a state in which it is loaded on the magnetic disk face 520, the head 600 is inserted into the lamp 610.

FIG. 9B is a sectional view of the lamp 610. On the inner side of the lamp 610, an uneven portion 611 is provided. If the unloaded head 600 is inserted into the lamp 610, the head 600 is brought into contact with the uneven portion 611, whereupon dust or oil adhering to the head 600 is removed. Consequently, in the case where the head 600 is loaded on the magnetic disk face 520 again, the possibility that a reading out error may occur may be reduced.

FIG. 10 is a view depicting an example of a head management table. The head management table 215 is created by the RAID controlling section 230 based on the error management table 212 corresponding to the same HDD and is stored into the storage section 210. The head management table 215 includes items of a head number, an error number, and an error number threshold value.

In the head management table 215, records are registered for each magnetic disk face on the HDD in advance. The item of a head number indicates a head number by which a magnetic disk face may be identified. The item of an error number indicates a total number of errors detected on the magnetic disk face corresponding to the head number. For example, in the item of an error number, a total number of records whose physical addresses belonging to the magnetic disk face are registered from among the records registered in the error management table 212 is registered. The error number threshold value is a threshold value for deciding whether or not a replacement process is to be executed. Basically, if the storage capacities of the magnetic disk faces are equal to each other, also the error number threshold values for the magnetic disk faces may be equal to each other. However, also it is possible to change the error number threshold value for each of the magnetic disk faces.

By using the head management table 215 having the configuration described above, an error occurrence time number is aggregated for each divisional region called "magnetic disk face" obtained by dividing the physical storage region of the HDD.

The RAID controlling section 230 estimates, in the case where the error number of a record corresponding to a certain magnetic disk face from among records of the head management table 215 exceeds the error number threshold value, that a failure has occurred in the overall magnetic disk face. At this time, the RAID controlling section 230 first doubts that, as a cause of the failure, dirt adheres to the head corresponding to the magnetic disk face. In order to recover the magnetic disk face against the failure, the RAID controlling section 230 controls the HDD to execute unloading of the head and then loading the head again. The RAID controlling section 230 confirms whether it is possible to read out data from the magnetic disk face on which the occurrence of a failure is estimated. In the case where it is possible to read out data, the RAID controlling section 230 continues access to the HDD without executing a replacement process. Consequently, it is possible to recover the HDD against a failure and continue use of the HDD without using a new replacement region.

In this manner, the RAID controlling section 230 specifies a region in which it is estimated that many errors occur and a failure occurs in a unit of a sector range, a unit of a track, or a unit of a magnetic disk face. The RAID controlling section 230 executes a recovery process for the specified region using a suitable method according to the type of the specified region (one of a sector range, a track, and a magnetic disk face). Consequently, it becomes possible to continuously use the HDD for a long period of time while replacement regions are used efficiently.

Further, according to a recovery process that is performed in a unit of a sector or a track, such a replacement process that a replacement region is used in place of a failure occurrence region is executed before a reading out request from many portions of regions in which a failure such as a scar occurs is requested. Consequently, the number of times by which reading out from a failure occurrence region is performed and a reading out error occurs may be reduced. As a result, the period of time before it is decided that an HDD fails based on the count value of the error counter table 211 may be increased and use of the HDD may be continued for an increased period of time.

On the other hand, according to a recovery process performed in a unit of a magnetic disk face, before a reading out request from many portions of a magnetic disk face on which a failure occurs is issued, an occurrence cause of the failure is removed such that reading out from the magnetic disk face may be executed normally. Consequently, the number of times by which reading out from a magnetic disk face in a state in which a failure occurs is performed to cause a reading out error may be reduced. As a result, the time before it is decided that the HDD fails based on the count value of the error counter table 211 may be increased thereby to make it possible to continue use of the HDD for a long period of time.

Further, by any recovery process, the reading out performance of the HDD may be improved by reducing the error occurrence time number when a reading out request is issued. For example, the response performance when the I/O controlling section 220 issues a reading out request from the HDD to the RAID controlling section 230 in accordance with a request from the host apparatus 400 may be improved. As a result, it is possible to suppress the response performance to an access request from the host apparatus 400 from degrading together with occurrence of a failure in the HDD and improve the response performance of the HDD.

Now, a process executed by the CM 200 is described with reference to a flow chart.

Figure 11:
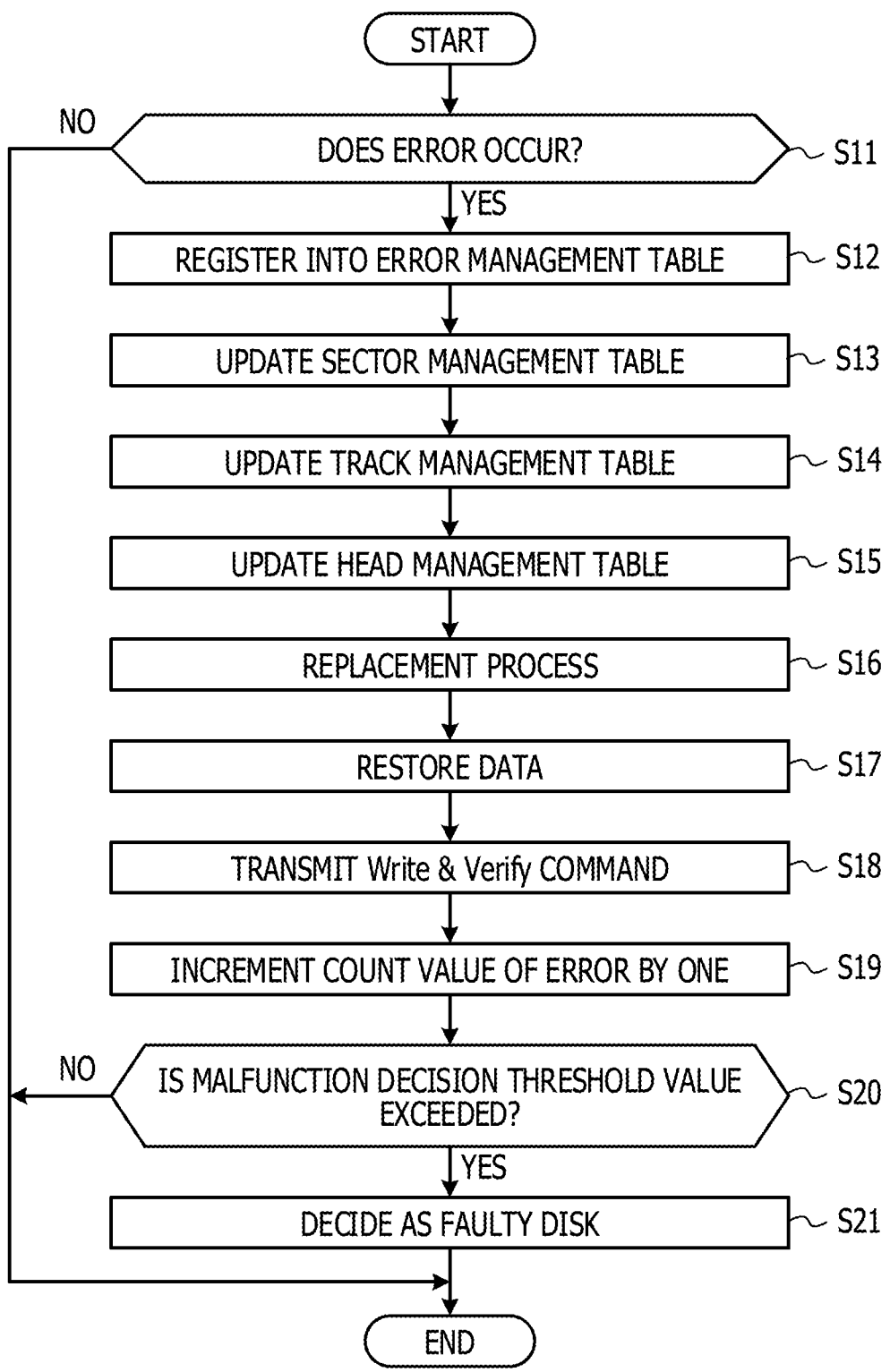
FIG. 11 is a flow chart depicting an example of a process when an error occurs.

FIG. 11 is a flow chart depicting an example of a process when an error occurs. The process of FIG. 11 is started in response to transmission of a read request from the RAID controlling section 230 to the HDD. For example, the RAID controlling section 230 transmits a read request to the HDD in response to outputting, when the I/O controlling section 220 receives a read request from the host apparatus 400, of a read request of corresponding data from the I/O controlling section 220 in response to the reception. Otherwise, the RAID controlling section 230 transmits a read request to the HDD through execution of a patrol process.

Here, as an example, it is assumed that a read request is transmitted to the HDD 301. The read request includes an LBA as a reading out source address. In the following, the process depicted in FIG. 11 is described along the step numbers.

(S11) In the case where an error occurs in response to transmission of a read request, the RAID controlling section 230 advances its process to step S12. On the other hand, in the case where read data is normally acquired successfully in response to transmission of the read request, the RAID controlling section 230 ends the process. It is to be noted that, in the case where read data is acquired normally in response to the read request from the I/O controlling section 220, the RAID controlling section 230 outputs the read data to the I/O controlling section 220.

(S12) The RAID controlling section 230 transmits a command for acquiring a physical address corresponding to the LBA included in the read request to the HDD 301.

The controller of the HDD 301 refers to a table in which LBAs and physical addresses are associated with each other to specify a physical address (a track number, a head number, and a sector number) corresponding to the LBA designated by the command. The controller transmits the specified physical address to the CM 200. The RAID controlling section 230 receives the physical address.

The RAID controlling section 230 specifies an error management table 212 corresponding to the HDD 301 and creates a new record in the specified error management table 212. The RAID controlling section 230 registers the LBA included in the read request and the track number, the head number, and the sector number received from the HDD 301 into the created record.

(S13) The RAID controlling section 230 specifies a sector management table 213 corresponding to the HDD 301. The RAID controlling section 230 specifies, from within the specified sector management table 213, a record in which a sector range to which the head number and the sector number registered in the error management table 212 at step S12 belong is registered. The RAID controlling section 230 increments the error number of the specified record by one.

(S14) The RAID controlling section 230 specifies a track management table 214 corresponding to the HDD 301. The RAID controlling section 230 refers to the specified track management table 214 and increments the error number associated with the head number and the track number registered in the error management table 212 at step S12 by one.

(S15) The RAID controlling section 230 specifies a head management table 215 corresponding to the HDD 301. The RAID controlling section 230 refers to the specified head management table 215 and increments the error number associated with the head number registered in the error management table 212 at step S12 by one.

(S16) The RAID controlling section 230 transmits a command for causing a replacement process for the LBA included in the read request to be executed to the HDD 301. The controller of the HDD 301 changes the physical address allocated to the LBA designated by the command to a physical address of an unused region in the replacement region.

(S17) The RAID controlling section 230 restores data stored in the LBA included in the read request using data recorded in a different HDD belonging to a RAID group same as that of the HDD 301. It is to be noted that the data restoration method is detected depending upon the RAID level set to the RAID group, the number of HDDs belonging to the HDD group and so forth.

(S18) The RAID controlling section 230 transmits a Write & Verify command to the HDD 301 together with the restored data. Consequently, the controller of the HDD 301 writes the data restored at step S17 into the region after the allocation is changed at step S16. Further, the controller confirms whether or not the data is written correctly. For example, the controller compares the data received from the RAID controlling section 230 and the data read out from the writing destination region with each other to confirm whether they are coincident with each other. If it is confirmed that the data is written correctly, a notification of this is conveyed to the CM 200. When the RAID controlling section 230 receives the notification, it advances the process to step S19.

(S19) The RAID controlling section 230 refers to the error counter table 211 and increments the error count value corresponding to the HDD 301 by one.

(S20) The RAID controlling section 230 decides whether or not the count value incremented at step S19 exceeds a given malfunction decision threshold value. It is to be noted that the malfunction decision threshold value is stored in the storage section 210.

In the case where the malfunction decision threshold value is exceeded, the RAID controlling section 230 advances the process to step S21. On the other hand, in the case where the failure detection threshold value is not exceeded, the RAID controlling section 230 ends the process.

(S21) The RAID controlling section 230 decides that the HDD 301 is a faulty disk and, for example, decouples the HDD 301. Then, the RAID controlling section 230 ends the process.

Figure 12:
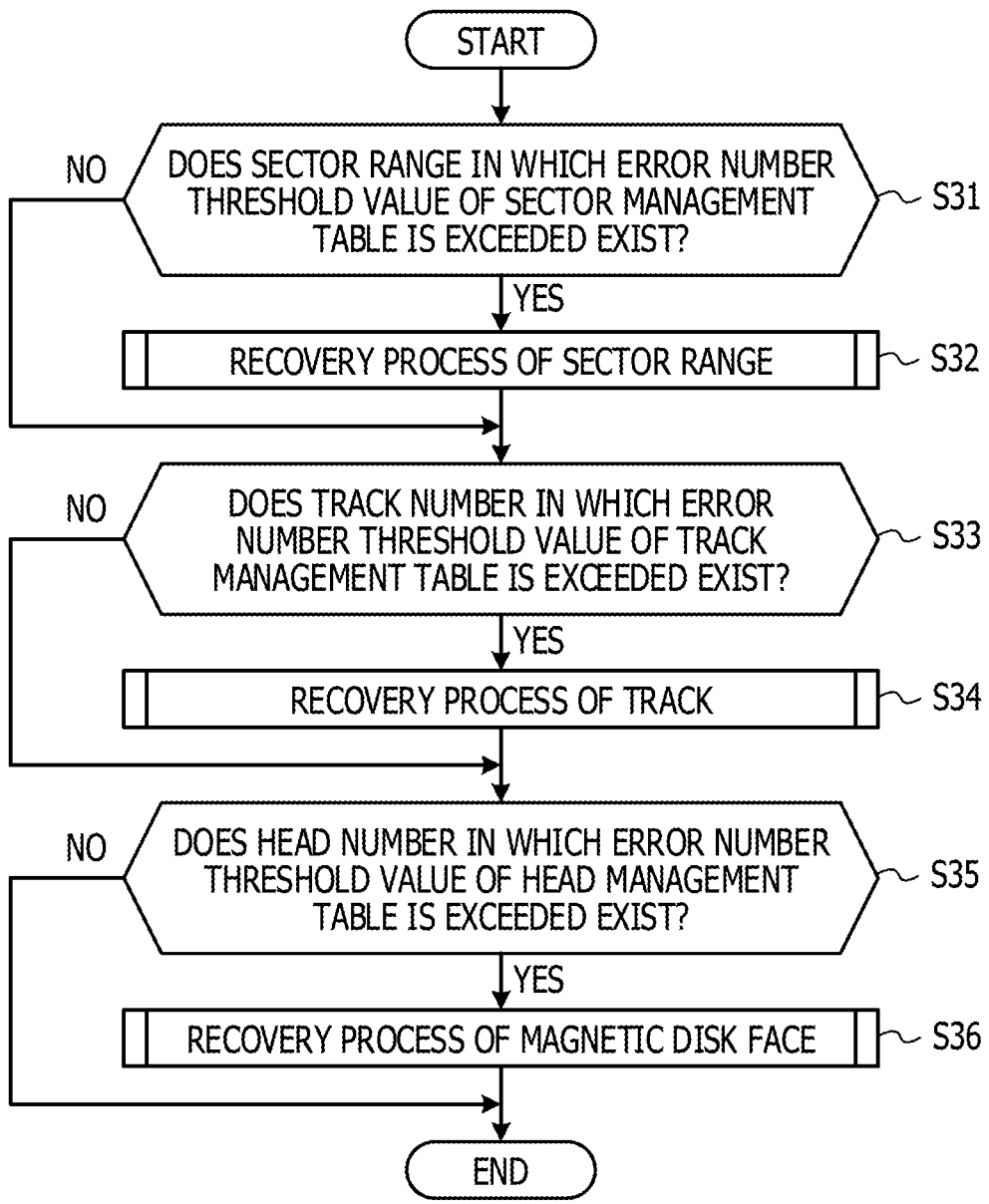
FIG. 12 is a flow chart depicting an example of a failure occurrence decision process in a unit of a divisional region.

FIG. 12 is a flow chart depicting an example of a failure occurrence decision process in a unit of a divisional region. For example, the process of FIG. 12 is executed following the process of FIG. 11 or at given intervals. It is to be noted that, while a failure occurrence decision process in regard to the HDD 301 is described as an example here, actually the process of FIG. 12 is executed for each of the HDDs incorporated in the DE 300. In the following, the process depicted in FIG. 12 is described along step numbers.

(S31) The RAID controlling section 230 refers to a sector management table 213 corresponding to the HDD 301 to decide whether or not a sector range in which the error number exceeds the error number threshold value exists. In the case where a sector range in which the error number exceeds the error number threshold value exists, the RAID controlling section 230 advances the process to step S32. In the case where a sector range in which the error number exceeds the error number threshold value does not exist, the RAID controlling section 230 advances the process to step S33.

(S32) The RAID controlling section 230 executes a recovery process of the sector range.

(S33) The RAID controlling section 230 refers to the track management table 214 to decide a track in which the error number exceeds the error number threshold value exists. In the case where a track in which the error number exceeds the error number threshold value exists, the RAID controlling section 230 advances the process to step S34. On the other hand, in the case where a track in which the error number exceeds the error number threshold value does not exist, the RAID controlling section 230 advances the process to step S35.

(S34) The RAID controlling section 230 executes a recovery process of the track.

(S35) The RAID controlling section 230 refers to the head management table 215 to decide whether or not a head number in regard to which the error number exceeds the error number threshold value exists. In the case where a head number in regard to which the error number exceeds the error number threshold value exists, the RAID controlling section 230 advances the process to step S36. In the case where a head number in regard to which the error number exceeds the error number threshold value does not exist, the RAID controlling section 230 ends the process.

(S36) The RAID controlling section 230 executes a recovery process for a magnetic disk face corresponding to the head whose error number exceeds the error number threshold value.

Figure 13:
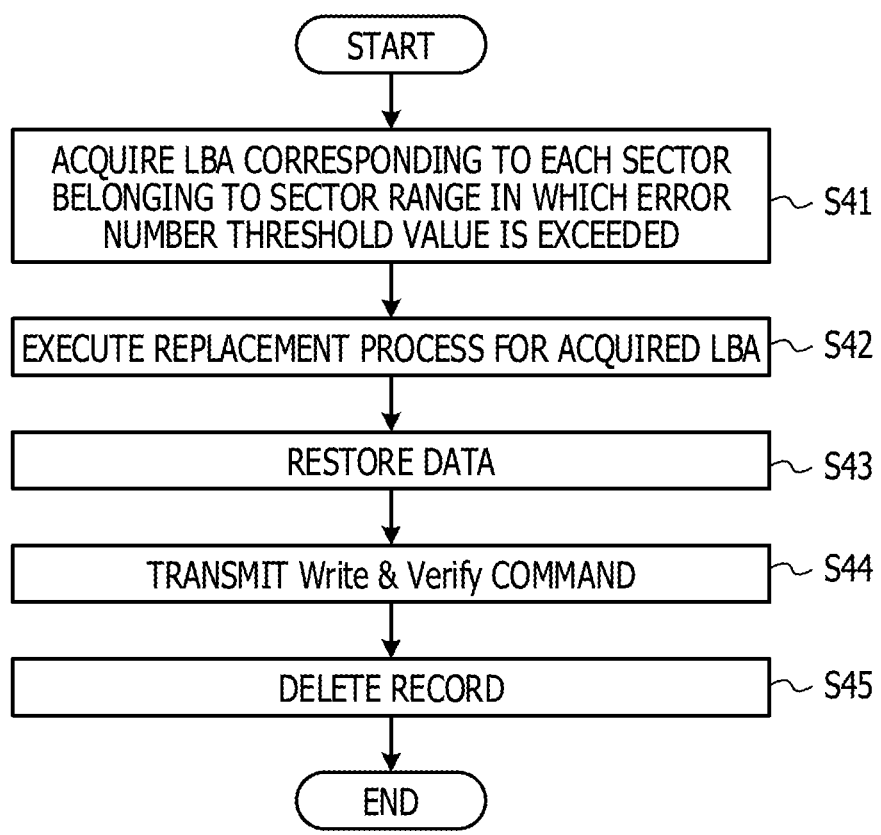
FIG. 13 is a flow chart depicting an example of a recovery process of a sector range.

FIG. 13 is a flow chart depicting an example of a recovery process of a sector range. The process depicted in FIG. 13 corresponds to the process at step S32. At step S32, the process of FIG. 13 is executed for each of sector ranges in which it is decided at step S31 that the error number exceeds the error number threshold value. In the following, the process depicted in FIG. 13 is described along the step numbers.

(S41) Here, it is assumed that the size of each sector on the magnetic disk face and the size of a logical block indicated by the LBA are substantially equal to each other. The RAID controlling section 230 transmits a command for acquiring an LBA associated with each of the sectors belonging to a sector range whose error number exceeds the error number threshold value to the HDD 301. The transmitted command includes a physical address (a track number, a head number, and a sector number) indicative of each sector. The physical addresses are decided based on the physical address information of the sector ranges registered in the item of a sector range of the sector management table 213.

The controller of the HDD 301 refers to a table in which the LBAs and the physical addresses are associated with each other and transmits an LBA associated with each physical address designated by the command to the CM 200. The RAID controlling section 230 receives the LBA transmitted from the controller.

Then, the RAID controlling section 230 executes processes at steps S42 to S45 for each of the received LBAs.

(S42) The RAID controlling section 230 transmits a command for causing the HDD 301 to execute a replacement process for the LBA to the HDD 301. The controller of the HDD 301 changes the physical address allocated to the LBA designated by the command to a physical address of an unused region in the replacement region.

(S43) The RAID controlling section 230 restores data stored in the LBA, whose replacement process is executed at step S42, using data recorded in a different HDD belonging to a RAID group same as that to which the HDD 301 belongs.

(S44) The RAID controlling section 230 receives a Write & Verify command to the HDD 301 together with the restore data. Consequently, the controller of the HDD 301 writes the data restored at step S43 into the region after the allocation is changed at step S42. Further, the controller confirms whether or not the data is written correctly, and issues, in the case where it is confirmed that the data is written correctly, a notification of this to the CM 200. The RAID controlling section 230 receives the notification and advances the process to step S45.

(S45) The RAID controlling section 230 refers to the error management table 212 to delete the record that includes the LBA for which the replacement process is executed at step S42. Further, in the case where the processes at steps S42 to S44 are executed for all LBAs received at step S41, the RAID controlling section 230 refers to the sector management table 213 to reset the error number of the record corresponding to the sector range of the processing target to "0."

In this manner, in the case where the error number corresponding to a sector range exceeds the error number threshold value, the RAID controlling section 230 infers that a longitudinal scar exists within the sector range. In order that a storage region corresponding to the longitudinal scar may not be accessed, the RAID controlling section 230 controls the HDD to execute a replacement process. Consequently, the error detection time number in the case where the RAID controlling section 230 issues a reading out request to the HDD is suppressed. As a result, the period of time until it is decided that the HDD fails based on the count value of the error counter table 211 may be elongated, and use of the HDD may be continued for an increase period of time. Further, since the error detection time number is suppressed, degradation of the reading out performance of the HDD caused by a scar may be suppressed.

Figure 14:
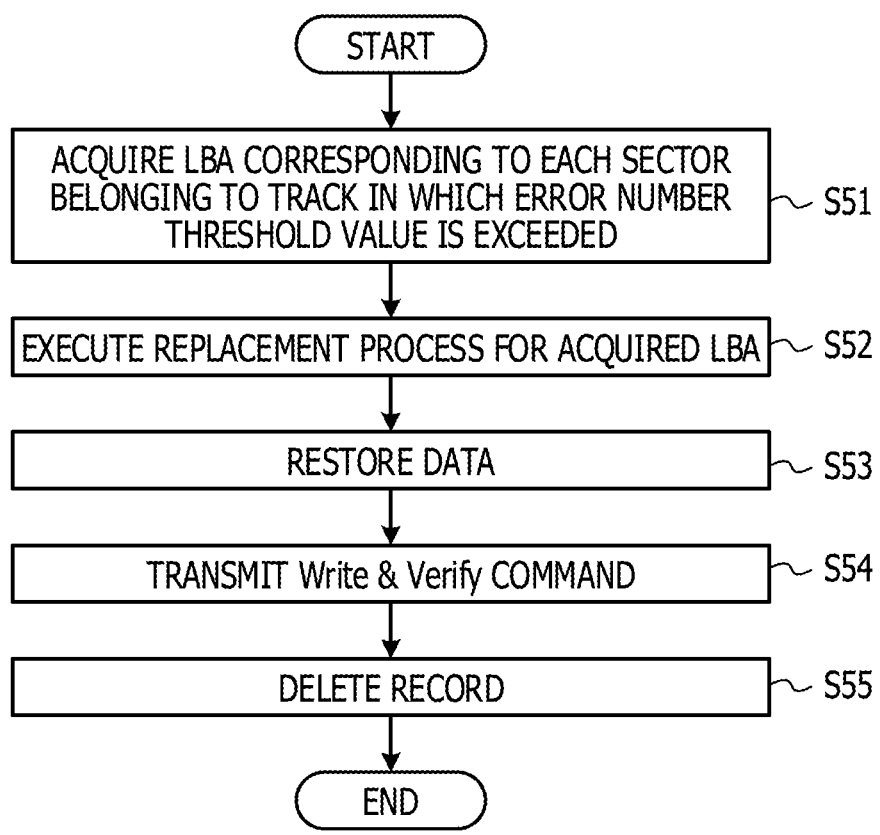
FIG. 14 is a flow chart depicting an example of a recovery process of a track.

FIG. 14 is a flow chart depicting an example of a recovery process of a track. The process depicted in FIG. 14 corresponds to the process at step S34. At step S34, the process of FIG. 14 is executed for each of tracks in which it is decided at step S33 that the error number exceeds the error number threshold value. In the following, the process depicted in FIG. 14 is described along step numbers.

(S51) The RAID controlling section 230 transmits a command for acquiring an LBA associated with each sector belonging to a track in which the error number exceeds the error number threshold value to the HDD 301. The transmitted command includes a physical address (a head number and a track number) indicative of the track. The physical addresses are decided based on the physical address information registered in the items of a head number and a track number of the track management table 214.

The controller of the HDD 301 refers to a table in which LBAs and physical addresses are associated with each other and transmits an LBA associated with each physical address designated by the command to the CM 200. The RAID controlling section 230 acquires the LBAs transmitted from the controller.

Then, the RAID controlling section 230 executes processes at steps S52 to S55 for each of the received LBAs.

(S52) The RAID controlling section 230 transmits a command for causing the HDD 301 to execute a replacement process for the LBA to the HDD 301. The controller of the HDD 301 changes the physical address allocated to the LBA designated by the command to a physical address of an unused region in the replacement region.

(S53) The RAID controlling section 230 restores data stored in the LBA for which the replacement process is executed at step S52 using data recorded in a different HDD belonging to a RAID group same as that of the HDD 301.

(S54) The RAID controlling section 230 transmits a Write & Verify command to the HDD 301 together with the restored data. Consequently, the controller of the HDD 301 writes the data restored at step S53 into the region after the allocation is changed at step S52. Further, the controller confirms whether or not the data is written correctly. In the case where it is confirmed that the data is written correctly, the controller issues a notification of this to the CM 200. The RAID controlling section 230 receives the notification and advances the process to step S55.

(S55) The RAID controlling section 230 refers to the error management table 212 to delete the record that includes the LBA for which the replacement process is executed at step S52. Further, in the case where the processes at steps S52 to S54 are executed for all of the LBAs received at step S51, the RAID controlling section 230 refers to the track management table 214 and resets the error number of the record corresponding to the track of the processing target to "0."

In this manner, in the case where the error number corresponding to a track exceeds the error number threshold value, the RAID controlling section 230 infers that a scar exists in a direction along the track. In order that the track may not be accessed, the RAID controlling section 230 controls the HDD to execute a replacement process. Consequently, the error detection time number in the case where the RAID controlling section 230 issues a reading out request to the HDD is suppressed. As a result, it is possible to elongate the period of time until it is decided that the HDD fails based on the count value of the error counter table 211 and continue use of the HDD for an increased period of time. Further, since the error detection time number is suppressed, degradation of the reading out performance of the HDD by occurrence of a scar may be suppressed.

Figure 15:
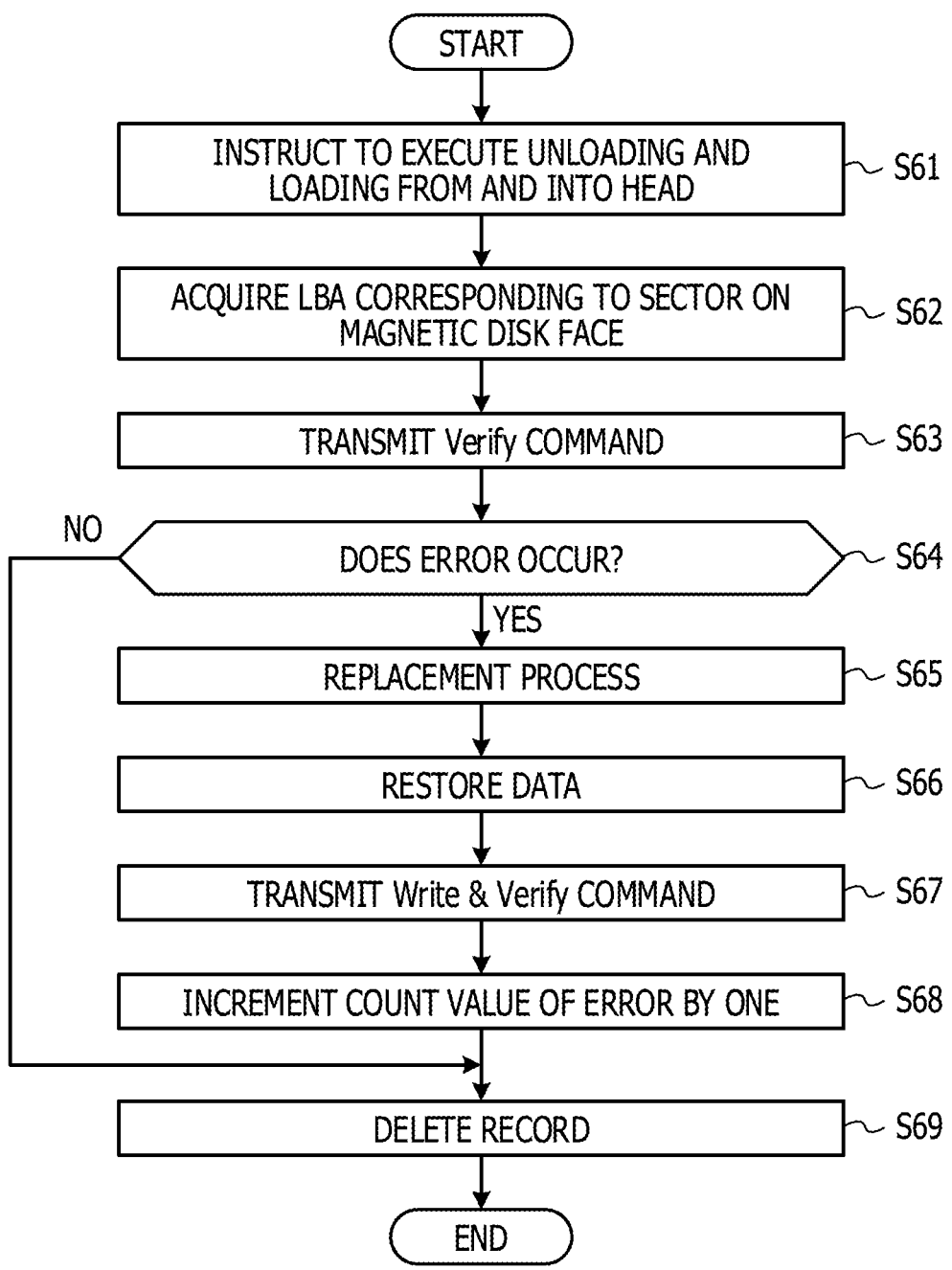
FIG. 15 is a flow chart illustrating an example of a recovery process of a magnetic disk face.

FIG. 15 is a flow chart depicting an example of a recovery process of a magnetic disk face. The process depicted in FIG. 15 corresponds to the process at step S36. In the following, the process depicted in FIG. 15 is described along the step numbers.

(S61) The RAID controlling section 230 transmits a command for the instruction to unload the head to the HDD 301. Consequently, all heads incorporated in the HDD 301 are unloaded. At this time, dust or oil adhering to the heads are removed by the lamp 610. The RAID controlling section 230 thereafter transfers a command for the instruction to load a head to the HDD 301.

Then, the RAID controlling section 230 executes processes at steps S62 to S69 for each of magnetic disk faces in regard to which it is decided at step S35 that the error number exceeds the error number threshold value.

(S62) The RAID controlling section 230 transmits a command for acquiring an LBA associated with each of sectors belonging to the magnetic disk face (for example, the head) of the processing target to the HDD 301. The transmitted command includes at least a head number indicative of the magnetic disk face of the processing target. Further, although the LBA acquired by this process is made a target of Verify at next step S63, Verify may not be performed from the entirety of the magnetic disk face. Thus, the RAID controlling section 230 selects, for example, a given number of sector numbers at given intervals and transmits a command that designates the head number and the selected sector numbers to the HDD 301. Consequently, from the controller of the HDD 301, an LBA associated with the sector indicated by the selected sector number is transmitted.

(S63) The RAID controlling section 230 transmits a Verify command designating each LBA acquired at step S62 to the HDD 301. The controller of the HDD 301 confirms whether it is possible to normally read out data from a physical address corresponding to each designated LBA (for example, a physical address on the magnetic disk face of the processing target), and transmits a result of the confirmation to the CM 200.

(S64) The RAID controlling section 230 decides whether or not an error occurs upon reading out from at least one LBA by the process at step S63. In the case where normal reading out is performed in regard to all LBAs, the RAID controlling section 230 advances the process to step S69. On the other hand, in the case where an error occurs, the RAID controlling section 230 executes processes at steps S65 to S68 for each of the LBAs that an error has occurred.

(S65) The RAID controlling section 230 transmits a command for causing the HDD 301 to execute a replacement process for the LBA of the processing target to the HDD 301. The controller of the HDD 301 converts the physical address allocated to the LBA designated by the command to a physical address of an unused region in the replacement region.

(S66) The RAID controlling section 230 restores data stored in the LBA included in the read request using data recorded on a different HDD belonging to a RAID group same as that to which the HDD 301 belongs.

(S67) The RAID controlling section 230 transmits a Write & Verify command to the HDD 301 together with the restored data. Consequently, the controller of the HDD 301 writes the data restored at step S17 into the region after the allocation is changed at step S65. Further, the controller confirms whether or not the data is written correctly. In the case where it is confirmed that the data is written correctly, the controller issues a notification of this to the CM 200. The RAID controlling section 230 receives the notification and advances the process to step S68.

(S68) The RAID controlling section 230 refers to the error counter table 211 and increments the count value of errors corresponding to the HDD 301 by one. It is to be noted that, though not depicted, in the case where the count value after the addition exceeds the malfunction decision threshold value, the RAID controlling section 230 decides that the HDD 301 is a faulty disk and decouples the HDD 301.

(S69) The RAID controlling section 230 deletes the record in which the head number indicative of the magnetic disk face of the processing target is registered from the error management table 212. Further, in the case where it is decided that the processes at the steps beginning with step S62 are executed for all magnetic disk faces in regard to which it is decided at step S35 that the error number exceeds the error number threshold value, the RAID controlling section 230 refers to the head management table 215. The RAID controlling section 230 resets the error number of the records corresponding to the head numbers indicative of the magnetic disk faces to "0" and ends the process.

In the process of FIG. 15 described above, in the case where the error number corresponding to a magnetic disk face exceeds the error number threshold value, the RAID controlling section 230 infers that dirt adheres to the head corresponding to the magnetic disk face. The RAID controlling section 230 causes unloading of the heads to be executed at step S62 to remove the dirt adhering to the head thereby to make it possible to perform reading out from the magnetic disk normally. Since such recovery is executed preventively before reading out from most part of the magnetic disk face is performed, the error detection time number in the case where a reading out request is issued to the HDD from the RAID controlling section 230 is suppressed. As a result, it is possible to increase the period of time before it is decided that the HDD fails based on the count value of the error counter table 211 thereby to make it possible to continue use of the HDD for a long period of time. Further, since the error detection time number is suppressed, degradation of the reading out performance of the HDD caused by dirt to the head may be suppressed.

It is to be noted that the information processing of the first embodiment described hereinabove may be implemented by causing a program to be executed by a processor used for the storage controlling apparatus 1. Further, the information processing of the second embodiment described hereinabove may be implemented by causing the program to be executed by the processor 201. The program may be recorded on or into a computer-readable recording medium.

For example, the recording medium on which the program is recorded may be distributed by circulating the program. Further, programs for implementing the functions corresponding to the I/O controlling section 220 and the RAID controlling section 230 may be distributed separately as separate programs. The functions of the I/O controlling section 220 and the RAID controlling section 230 may be implemented by separate computers. A computer may store (install), for example, a program recorded on a recording medium into the RAM 202 or the SSD 203 such that it reads in the program from a recording apparatus and executes the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
   a memory; and
   a processor coupled to the memory and configured to:
      access a physical storage region in a storage apparatus, the physical storage region corresponding to a logical address of a logical storage region;
      when an error is detected in the accessing of the physical storage region corresponding to the logical address, obtain a physical address of the physical storage region;
      measure, for each of a plurality of divisional schemes, an error occurred number by using the obtained physical address, the error occurred number indicating a number of times in which the error is detected in the physical storage region, the plurality of divisional schemes including at least any of sectors, tracks, or heads; and
      execute a recovery processing when the error occurred number corresponding to any of the plurality of divisional schemes is equal to or greater than a first threshold, the recovery processing including:
         selecting a recovery target region from among the physical storage region in the storage apparatus, the recovery target region having a range corresponding to the any of the plurality of divisional schemes;
         selecting a first recovery method from among a plurality of recovery methods, each of the plurality of recovery methods corresponding to an associated divisional scheme from among the plurality of divisional schemes, the first recovery method corresponding to the any of the plurality of divisional scheme; and causing the storage apparatus to recover one or more logical addresses by using the first recovery method, each of the one or more logical addresses being a logical address belonging the recovery target region in the storage apparatus.

2. The storage control apparatus according to claim 1, wherein the processor is configured to:

when the first recovery method is selected from the plurality of recovery methods, cause the storage apparatus to change a first physical address in the physical storage region corresponding to the first logical address; and when a second recovery method is selected from the plurality of recovery methods, cause the storage apparatus to execute a process for restoring the recovery target region.

3. The storage control apparatus according to claim 2, wherein the storage apparatus includes a plurality of disks of recording medium, the plurality of regions include a plurality of first divisional regions generated by dividing each of a plurality of recording faces of the plurality of disks, and a plurality of second divisional regions individually corresponding to the plurality of recording faces, and the processor is configured to:

select the first recovery method when one of the plurality of first divisional regions is selected as the recovery target region, and select the second recovery method when one of the second divisional regions is detected as the recovery target region.

4. The storage control apparatus according to claim 3, wherein the processor is configured to: when the second recovery method is selected, cause the storage apparatus to unload heads for reading and writing the plurality of disks and load the heads again.

5. The storage control apparatus according to claim 3, wherein the plurality of first divisional regions included a plurality of third divisional regions generated by dividing the plurality of recording faces by a radial line from a center of the recording faces, and a plurality of fourth divisional regions individually corresponding to a plurality of tracks formed on the plurality of recording faces.

6. The storage control apparatus according to claim 2, wherein the processor is configured to:

when the first recovery method is selected, cause the storage apparatus to acquire first data and second data stored in the first logical address from a different storage apparatus; and write the acquired second data into the first logical address.

7. The storage control apparatus according to claim 1, wherein the processor is configured to when the number of times exceeds a threshold value, decide that the storage apparatus fails.

8. A method comprising:

accessing a physical storage region in a storage apparatus, the physical storage region corresponding to a logical address of a logical storage region;

when an error is detected in the accessing of the physical storage region corresponding to the logical address, obtaining a physical address of the physical storage region;

measuring, for each of a plurality of divisional schemes, an error occurred number by using the obtained physical address, the error occurred number indicating a number of times in which the error is detected in the physical storage region, the plurality of divisional schemes including at least any of sectors, tracks, or heads; and executing a recovery processing when the error occurred number corresponding to any of the plurality of divisional schemes is equal to or greater than a first threshold, the recovery processing including:

selecting a recovery target region from among the physical storage region in the storage apparatus, the recovery target region having a range corresponding to the any of the plurality of divisional schemes;

selecting a first recovery method from among a plurality of recovery methods, each of the plurality of recovery methods corresponding to an associated divisional scheme from among the plurality of divisional schemes, the first recovery method corresponding to the any of the plurality of divisional scheme; and causing the storage apparatus to recover one or more logical addresses by using the first recovery method, each of the one or more logical addresses being a logical address belonging the recovery target region in the storage apparatus.

9. The method according to claim 8, further comprising:

when the first recovery method is selected from the plurality of recovery methods, causing the storage apparatus to change a first physical address in the physical storage region corresponding to the first logical address; and when a second recovery method is selected from the plurality of recovery methods, causing the storage apparatus to execute a process for restoring the recovery target region.

10. The method according to claim 9, wherein the storage apparatus includes a plurality of disks of recording medium, the plurality of regions include a plurality of first divisional regions generated by dividing each of a plurality of recording faces of the plurality of disks, and a plurality of second divisional regions individually corresponding to the plurality of recording faces, and the method further comprises:

selecting the first recovery method when one of the plurality of first divisional regions is selected as the recovery target region, and select the second recovery method when one of the second divisional regions is detected as the recovery target region.

11. The method according to claim 10, further comprising when the second recovery method is selected, causing the storage apparatus to unload heads for reading and writing the plurality of disks and load the heads again.

12. The method according to claim 10, wherein the plurality of first divisional regions included a plurality of third divisional regions generated by dividing the plurality of recording faces by a radial line from a center of the recording faces, and a plurality of fourth divisional regions individually corresponding to a plurality of tracks formed on the plurality of recording faces.

13. The method according to claim 9, further comprising:

when the first recovery method is selected, causing the storage apparatus to acquire first data and second data stored in the first logical address from a different storage apparatus; and writing the acquired second data into the first logical address.

14. The method according to claim 8, further comprising when the number of times exceeds a threshold value, deciding that the storage apparatus fails.

15. A non-transitory computer-readable storage medium storing a program that causes an information processing apparatus to execute a process, the process comprising:
  accessing a physical storage region in a storage apparatus, the physical storage region corresponding to a logical address of a logical storage region;
  when an error is detected in the accessing of the physical storage region corresponding to the logical address, obtaining a physical address of the physical storage region;
  measuring, for each of a plurality of divisional schemes, an error occurred number by using the obtained physical address, the error occurred number indicating a number of times in which the error is detected in the physical storage region, the plurality of divisional schemes including at least any of sectors, tracks, or heads; and
  executing a recovery processing when the error occurred number corresponding to any of the plurality of divisional schemes is equal to or greater than a first threshold, the recovery processing including:
    selecting a recovery target region from among the physical storage region in the storage apparatus, the recovery target region having a range corresponding to the any of the plurality of divisional schemes;
    selecting a first recovery method from among a plurality of recovery methods, each of the plurality of recovery methods corresponding to an associated divisional scheme from among the plurality of divisional schemes, the first recovery method corresponding to the any of the plurality of divisional scheme; and
  causing the storage apparatus to recover one or more logical addresses by using the first recovery method, each of the one or more logical addresses being a logical address belonging the recovery target region in the storage apparatus.

16. The non-transitory computer-readable storage medium according to claim 15, the process further comprising:
  when the first recovery method is selected from the plurality of recovery methods, causing the storage apparatus to change a first physical address in the physical storage region corresponding to the first logical address; and
  when a second recovery method is selected from the plurality of recovery methods, causing the storage apparatus to execute a process for restoring the recovery target region.

17. The non-transitory computer-readable storage medium according to claim 16, wherein
  the storage apparatus includes a plurality of disks of recording medium,
  the plurality of regions include a plurality of first divisional regions generated by dividing each of a plurality of recording faces of the plurality of disks, and a plurality of second divisional regions individually corresponding to the plurality of recording faces, and the process further comprises:
    selecting the first recovery method when one of the plurality of first divisional regions is selected as the recovery target region, and select the second recovery method when one of the second divisional regions is detected as the recovery target region.

18. The non-transitory computer-readable storage medium according to claim 17, the process further comprising when the second recovery method is selected, causing the storage apparatus to unload heads for reading and writing the plurality of disks and load the heads again.

19. The non-transitory computer-readable storage medium according to claim 17, wherein the plurality of first divisional regions included a plurality of third divisional regions generated by dividing the plurality of recording faces by a radial line from a center of the recording faces, and a plurality of fourth divisional regions individually corresponding to a plurality of tracks formed on the plurality of recording faces.

20. The non-transitory computer-readable storage medium according to claim 16, the process further comprising:
  when the first recovery method is selected, causing the storage apparatus to acquire first data and second data stored in the first logical address from a different storage apparatus; and
  writing the acquired second data into the first logical address.

* * * * *